US012799440B2

(12) United States Patent
Shen et al.

(10) Patent No.: US 12,799,440 B2
(45) Date of Patent: Nov. 17, 2026

(54) METHOD FOR AGING AND STORAGE OF JIANG-FLAVOR BAIJIU BY GROWING, NOURISHING AND STORING

(71) Applicant: Sichuan Langjiu Co., Ltd., Luzhou (CN)

(72) Inventors: Yi Shen, Luzhou (CN); Bo Chen, Luzhou (CN); Li He, Luzhou (CN); Xiuqi Yang, Luzhou (CN); Yi Peng, Luzhou (CN); Dongmei Wang, Luzhou (CN); Tao Deng, Luzhou (CN)

(73) Assignee: SICHUAN LANGJIU CO., LTD., Luzhou (CN)

( * ) Notice: Subject to any disclaimer, the term of this patent is extended or adjusted under 35 U.S.C. 154(b) by 618 days.

(21) Appl. No.: 18/457,483

(22) Filed: Aug. 29, 2023

(65) Prior Publication Data

US 2024/0067907 A1 Feb. 29, 2024

(30) Foreign Application Priority Data

Aug. 29, 2022 (CN) ......................... 202211038965.0

(51) Int. Cl.
*C12H 1/22* (2006.01)

(52) U.S. Cl.
CPC ...................................... *C12H 1/22* (2013.01)

(58) Field of Classification Search
CPC ........................................................ C12H 1/22
USPC ............................................................ 426/11
See application file for complete search history.

(56) References Cited

FOREIGN PATENT DOCUMENTS

| | | | | |
|---|---|---|---|---|
| CN | 101792709 | A | | 8/2010 |
| CN | 102382745 | A | * | 3/2012 |
| CN | 105907589 | A | | 8/2016 |
| CN | 110437965 | A | | 11/2019 |
| CN | 111621397 | A | | 9/2020 |
| CN | 112094721 | A | | 12/2020 |

* cited by examiner

*Primary Examiner* — Brent T O'Hern
(74) *Attorney, Agent, or Firm* — NKL Law; Allen Xue

(57) ABSTRACT

A method for aging and storage of Jiang-flavor raw liquor involves "growing, nourishing and storing." The Jiang-flavor new liquors of different rounds are subjected to outdoor storage in jars for not more than 1 year, then the Jiang-flavor raw liquors of different rounds having experienced the outdoor storage in jars for not more than 1 year are blended and put into stainless steel tank for blending and aging for a period of 1 to 2 years, and finally the Jiang-flavor raw liquor having experiencing the blending and ageing in the stainless steel tank for 1 to 2 years undergoes indoor storage in jars for 2 to 10 years. The method combines different storage containers with different storage years, improving the aging and storage effect and the quality of the Jiang-flavor raw liquor in a targeted manner.

9 Claims, No Drawings

METHOD FOR AGING AND STORAGE OF JIANG-FLAVOR BAIJIU BY GROWING, NOURISHING AND STORING

TECHNICAL FIELD

The present invention relates to the Baijiu storage field, particularly to a method for aging and storage of Jiang-flavor Baijiu by "growing, nourishing and storing".

BACKGROUND

The Jiang-flavor Baijiu is one of the top four Baijius of flavor type, with a process characteristics of "four highs and two longs", wherein one of the "two longs" is long storage time. A bottle of Jiang-flavor Baijiu needs to be stored for at least three years or even longer before it can be put on the market, which is one of the key processes to ensure the quality of Jiang-flavor Baijiu.

And the aging and storage effect of Baijiu generally depends on storage containers, environment, period, method and other factors. The traditional method of aging and storage of Baijiu is to put the distilled new liquor in a container and place it in the warehouse for long-term natural storage. The aging effect will gradually increase as the natural storage time increases.

At present, the aging effect and quality improvement technology for the Jiang-flavor Baijiu during natural storage are still in a blank, and there is an urgent need to explore an aging and storage technology that is conducive to improving the quality of Jiang-flavor raw liquor, so as to improve both the aging effect and the quality during the storage process, which is of great research value.

SUMMARY

The present invention provides a method for aging and storage of Jiang-flavor Baijiu by "growing, nourishing and storing" to realize the combination of different storage containers with different storage years, thus improve the aging and storage effect and the quality of the Jiang-flavor raw liquor in a targeted manner.

The technical solution used for the present invention is as follows:

1. The present invention provides a method for aging and storage of Jiang-flavor Baijiu by "growing, nourishing and storing", wherein the Jiang-flavor new liquor first undergo outdoor storage in jars, then storage in a stainless steel tanks, and finally indoor storage in jars.

The present invention provides a method for aging and storage of Jiang-flavor Baijiu by "growing, nourishing and storing", comprising the following steps:

S1. Outdoor storage in jars: The Jiang-flavor new liquors are put into pottery jars respectively for outdoor storage for a period of one year;

S2. Storage in stainless steel tanks: The Jiang-flavor raw liquor treated in S1 is blended, and the blended Jiang-flavor raw liquor is put into stainless steel liquor tanks for outdoor storage for a period of 1 to 2 years;

S3. Indoor storage in jars: The Jiang-flavor raw liquor treated in S2 is put into pottery jars for indoor storage for a period of 2 to 10 years.

The present invention provides a method for aging and storage of Jiang-flavor Baijiu by "growing, nourishing and storing", wherein the Jiang-flavor new liquor includes at least one of the first, the second, the third, the fourth, the fifth, the sixth and the seventh rounds of Jiang-flavor new liquors.

The present invention provides a method for aging and storage of Jiang-flavor Baijiu by "growing, nourishing and storing", wherein the pottery jar is made from original limestone by firing it at 800-1100° C., which is acid, alkali and corrosion resistant, with a good air permeability.

The present invention provides a method for aging and storage of Jiang-flavor Baijiu by "growing, nourishing and storing", and the outdoor storage environment according to S1 is an annual frost free period of more than 300 days.

The present invention provides a method for aging and storage of Jiang-flavor Baijiu by "growing, nourishing and storing", wherein the stainless steel liquor tank is made of 304 stainless steel of food grade.

The present invention provides a method for aging and storage of Jiang-flavor Baijiu by "growing, nourishing and storing", wherein the storage condition for the stainless steel liquor tank is an annual frost free period of more than 300 days.

The present invention provides a method for aging and storage of Jiang-flavor Baijiu by "growing, nourishing and storing", wherein the indoor storage conditions are avoiding direct sunlight and keeping the temperature at 18-22° C.

The present invention provides a Jiang-flavor Baijiu, which is made using the above-mentioned aging and storage method.

With the above technical solution, the beneficial effects of the present invention are as follows: Depending on the storage and aging effects of different containers, times, environments and methods, and in combination with the storage requirements of Jiang-flavor raw liquor in different periods of time, the present invention provides a method for aging and storage of Jiang-flavor raw liquor in a path of "outdoor storage in jars"→"storage in stainless steel tanks"→"indoor storage in jars", which is specifically as follows: the Jiang-flavor new liquors of different rounds are subjected to the outdoor storage in jars for not more than 1 year, then the Jiang-flavor raw liquors of different rounds having experienced the outdoor storage in jars for not more than 1 year are blended and put into stainless steel tank for blending and aging for a period of 1 to 2 years, and finally the Jiang-flavor raw liquor having been aged in the stainless steel tank for 1 to 2 years undergoes indoor storage in jars for 2 to 10 years. The present invention combines different storage containers with different storage years, which is more conducive to the volatilization of sulfide in the early stage, improving the aging and storage effect and the quality of the Jiang-flavor raw liquor in a targeted manner.

DETAILED DESCRIPTION OF THE PREFERRED EMBODIMENTS

The present invention is described below in detail in combination with the embodiments.

The present invention will be further described in details in combination with the following embodiments for the purpose of clear understanding of the objective, technical solution and advantages of the present invention. It should be understood that the embodiments described herein are only used to explain the present invention rather than defining the present invention.

Embodiment 1

The Jiang-flavor new liquor in this embodiment is prepared using existing methods. After being checked and accepted by the brewing workshop and the cellar, the Jiang-flavor liquors of the first, the second, the third, the fourth, the fifth, the sixth and the seventh rounds are obtained.

A method for aging and storage of Jiang-flavor Baijiu by "growing, nourishing and storing", comprising the following steps:

(1) Outdoor Storage in Jars for 1 to 2 Years

In the first year, the Jiang-flavor new liquor contains volatile, irritating, and unpleasant sulfides that give a more pungent aroma and flavor to the liquor body. Only after storage for a certain period of time, can the small-molecule thiols with a low boiling point be evaporated and the liquor body gradually become soft.

By tracking a batch of Jiang-flavor new liquors stored in different containers for each round, the effects of removing impurities and freshness at 1 and 2 years were compared from the perspectives of sulfide volatilization rate and sensory evaluation, including outdoor jar storage, stainless steel tank storage, and indoor jar storage. Wherein the changes in sulfide content are shown in Tables 1 and 2, and the sensory changes are shown in Tables 3 and 4

Wherein the pottery jar is made from original limestone by firing it at 1000° C., which is acid, alkali and corrosion resistant, with a good air permeability, and with an annual frost free period of 320 days during the storage; In term of stainless steel storage, the stainless steel tank is made of 304 stainless steel of food grade, with an annual frost free period of 310 days during one year of storage; The pottery jar for indoor storage is made from original limestone by firing it at 1000° C., which is acid, alkali and corrosion resistant, with a good air permeability, and during the indoor storage, there is no direct sunlight, and the temperature is 20° C.

TABLE 1

Comparison of Sulfide Content (ug $L^{-1}$) in Jiang-flavor New Liquor after Storage for 1 Year with Different Technologies

| Item | Round of Jiang-flavor new liquor | Initial value | Outdoor storage in jars for 1 year | Indoor storage in jars for 1 year | Storage in stainless steel tanks for 1 year |
|---|---|---|---|---|---|
| Methyl mercaptan | The first round | 537.48 | 1.85 | 2.67 | 5.38 |
| | The second round | 504.77 | 2.09 | 4.17 | 10.63 |
| | The third round | 472.42 | 1.24 | 3.75 | 6.84 |
| | The fourth round | 482.38 | 3.54 | 6.25 | 8.10 |
| | The fifth round | 479.64 | 2.07 | 3.76 | 7.51 |
| | The sixth round | 458.62 | 3.21 | 5.76 | 9.04 |
| | The seventh round | 448.91 | 1.63 | 4.25 | 6.36 |
| Ethanethiol | The first round | 76.34 | 0.28 | 2.35 | 6.74 |
| | The second round | 80.27 | 1.28 | 3.29 | 4.38 |
| | The third round | 70.52 | 2.38 | 5.26 | 6.41 |
| | The fourth round | 74.98 | 2.09 | 3.66 | 5.73 |
| | The fifth round | 71.78 | 1.07 | 2.56 | 6.31 |
| | The sixth round | 65.73 | 2.86 | 4.10 | 6.33 |
| | The seventh round | 67.08 | 1.76 | 3.27 | 5.38 |
| DMs | The first round | 135.17 | 3.35 | 5.32 | 6.93 |
| | The second round | 127.86 | 3.88 | 5.65 | 7.07 |
| | The third round | 141.76 | 4.07 | 6.84 | 8.64 |
| | The fourth round | 128.64 | 3.68 | 6.28 | 6.95 |
| | The fifth round | 133.27 | 4.27 | 7.41 | 7.54 |
| | The sixth round | 118.39 | 1.74 | 4.63 | 6.37 |
| | The seventh round | 120.67 | 2.05 | 3.75 | 5.68 |
| 1-heptanthiol | The first round | 70.56 | ND | 0.48 | 1.29 |
| | The second round | 74.63 | 1.27 | 2.56 | 2.76 |
| | The third round | 71.57 | ND | ND | 4.53 |
| | The fourth round | 67.83 | 0.56 | 1.07 | 1.76 |
| | The fifth round | 68.54 | 1.15 | 1.86 | 2.65 |
| | The sixth round | 69.04 | ND | 0.54 | 1.61 |
| | The seventh round | 63.51 | 0.25 | 1.06 | 1.77 |
| Furfuryl mercaptan | The first round | 39.85 | ND | 0.92 | 1.08 |
| | The second round | 36.65 | 0.16 | 1.27 | 1.54 |
| | The third round | 37.25 | 0.10 | 1.08 | 2.15 |
| | The fourth round | 34.57 | ND | ND | 1.65 |
| | The fifth round | 37.15 | 0.56 | 1.16 | 1.73 |
| | The sixth round | 30.64 | 0.71 | 1.69 | 2.01 |
| | The seventh round | 35.67 | ND | 1.38 | 1.65 |

TABLE 1

Comparison of Sulfide Content (ug $L_{-1}$) in Jiang-flavor New Liquor after Storage for 2 Years with Different Technologies

| Item | Round of Jiang-flavor new liquor | Initial value | Outdoor storage in jars for 2 years | Indoor storage in jars for 2 years | Storage in stainless steel tanks for 2 years |
|---|---|---|---|---|---|
| Methyl mercaptan | The first round | 537.48 | 1.65 | 2.41 | 3.62 |
| | The second round | 504.77 | 1.76 | 3.52 | 5.63 |
| | The third round | 472.42 | 1.24 | 3.52 | 4.53 |
| | The fourth round | 482.38 | 2.61 | 3.63 | 4.63 |
| | The fifth round | 479.64 | 1.87 | 3.51 | 6.73 |
| | The sixth round | 458.62 | 2.76 | 4.73 | 6.53 |
| | The seventh round | 448.91 | 1.64 | 4.76 | 6.07 |
| Ethanethiol | The first round | 76.34 | 1.76 | 3.54 | 4.42 |
| | The second round | 80.27 | 1.65 | 3.65 | 5.61 |
| | The third round | 70.52 | 2.87 | 4.52 | 5.15 |
| | The fourth round | 74.98 | 1.62 | 4.76 | 5.54 |
| | The fifth round | 71.78 | 0.45 | 2.01 | 4.53 |
| | The sixth round | 65.73 | 0.65 | 3.16 | 3.67 |
| | The seventh round | 67.08 | 1.10 | 3.56 | 4.76 |
| DMs | The first round | 135.17 | 1.65 | 4.65 | 5.37 |
| | The second round | 127.86 | 1.07 | 3.65 | 4.76 |
| | The third round | 141.76 | 1.65 | 4.76 | 5.54 |
| | The fourth round | 128.64 | 2.65 | 3.62 | 4.67 |
| | The fifth round | 133.27 | 1.76 | 2.67 | 3.78 |
| | The sixth round | 118.39 | 0.65 | 2.61 | 3.52 |
| | The seventh round | 120.67 | 1.12 | 2.61 | 3.65 |
| 1-heptanthiol | The first round | 70.56 | ND | 0.24 | 0.76 |
| | The second round | 74.63 | 1.12 | 1.45 | 1.91 |
| | The third round | 71.57 | ND | ND | 1.65 |
| | The fourth round | 67.83 | 0.56 | 0.87 | 1.01 |
| | The fifth round | 68.54 | ND | ND | 1.71 |
| | The sixth round | 69.04 | ND | 0.23 | 0.76 |
| | The seventh round | 63.51 | ND | ND | 1.25 |
| Furfuryl mercaptan | The first round | 39.85 | ND | 0.65 | 0.66 |
| | The second round | 36.65 | ND | 0.72 | 0.85 |
| | The third round | 37.25 | 0.12 | 0.76 | 1.21 |
| | The fourth round | 34.57 | ND | ND | 0.95 |
| | The fifth round | 37.15 | 0.56 | 0.78 | 1.27 |
| | The sixth round | 30.64 | ND | 0.71 | 0.85 |
| | The seventh round | 35.67 | ND | 0.66 | 1.24 |

TABLE 3

Comparison of Sensory Changes of Jiang-flavor New Liquor after Storage for 1 Year with Different Technologies

| Liquor sample | Round of Jiang-flavor new liquor | Sensory comments |
|---|---|---|
| Outdoor storage in jars for 1 year | The first round | Clear and transparent, with a very obvious Jiang flavor and a new liquor taste. The liquor body is mellow and sweet, with a clean and very longtime aftertaste. |
| | The second round | Clear and transparent, with a very prominent Jiang flavor and a new liquor taste. The liquor body is mellow and sweet, with a clean and very longtime aftertaste. |
| | The third round | Clear and transparent, with a very prominent Jiang flavor, a very obvious Daqu flavor, and a new liquor taste. The liquor body is mellow and sweet, with a clean and very longtime aftertaste. |
| | The fourth round | Clear and transparent, with a very prominent Jiang flavor, a very obvious Daqu flavor, and a new liquor taste. The liquor body is mellow and sweet, with a clean and very longtime aftertaste. |
| | The fifth round | Clear and transparent, with a very prominent Jiang flavor, a very obvious Daqu flavor, and a new liquor taste. The liquor body is mellow and sweet, with a clean and very longtime aftertaste. |

TABLE 3-continued

Comparison of Sensory Changes of Jiang-flavor New Liquor after Storage for 1 Year with Different Technologies

| Liquor sample | Round of Jiang-flavor new liquor | Sensory comments |
|---|---|---|
| | The sixth round | Clear and transparent, with very prominent Jiang flavor, a Daqu flavor, and a new liquor taste. The liquor body is mellow and sweet, with a clean and very longtime aftertaste. |
| | The seventh round | Clear and transparent, with a very prominent Jiang flavor, a burnt, and a new liquor taste. The liquor body is mellow and sweet, with a clean and very longtime aftertaste. |
| Indoor storage in jars for 1 year | The first round | Clear and transparent, with a very obvious Jiang flavor and an obvious new liquor taste. The liquor body is mellow and sweet, with a clean and very longtime aftertaste. |
| | The second round | Clear and transparent, with a prominent Jiang flavor and an obvious new liquor taste. The liquor body is mellow and sweet, with a clean and longtime aftertaste. |
| | The third round | Clear and transparent, with a very prominent Jiang flavor, a very obvious Daqu flavor, and an obvious new liquor taste. The liquor body is mellow and sweet, with a clean and longtime aftertaste. |
| | The fourth round | Clear and transparent, with a very prominent Jiang flavor, a very obvious Daqu flavor, and an obvious new liquor taste. The liquor body |

TABLE 3-continued

Comparison of Sensory Changes of Jiang-flavor New Liquor after Storage for 1 Year with Different Technologies

| Liquor sample | Round of Jiang-flavor new liquor | Sensory comments |
|---|---|---|
| | | is mellow and sweet, with a clean and longtime aftertaste. |
| | The fifth round | Clear and transparent, with a very prominent Jiang flavor, a very obvious Daqu flavor, and an obvious new liquor taste. The liquor body is mellow and sweet, with a clean and longtime aftertaste. |
| | The sixth round | Clear and transparent, with a very prominent Jiang flavor, a Daqu flavor, and an obvious new liquor taste. The liquor body is mellow and sweet, with a clean and longtime aftertaste. |
| | The seventh round | Clear and transparent, with a very prominent Jiang flavor, a burnt, and obvious new liquor taste. The liquor body is mellow and sweet, with a clean and longtime aftertaste. |
| Storage in stainless steel tanks for 1 year | The first round | Clear and transparent, with a very obvious Jiang flavor and a very obvious new liquor taste. The liquor body is mellow and sweet, with a clean and very longtime aftertaste. |
| | The second round | Clear and transparent, with a prominent Jiang flavor and a very obvious new liquor taste. The liquor body is mellow and sweet, with a clean and longtime aftertaste. |
| | The third round | Clear and transparent, with a very prominent Jiang flavor and a very obvious Daqu flavor, and a very obvious new liquor taste. The liquor body is mellow and sweet, with a clean and longtime aftertaste. |
| | The fourth round | Clear and transparent, with a very prominent Jiang flavor and a very obvious Daqu flavor, and a very obvious new liquor taste. The liquor body is mellow and sweet, with a clean and longtime aftertaste. |
| | The fifth round | Clear and transparent, with a very prominent Jiang flavor and a very obvious Daqu flavor, and a very obvious new liquor taste. The liquor body is mellow and sweet, with a clean and longtime aftertaste. |
| | The sixth round | Clear and transparent, with a very prominent Jiang flavor, a Daqu flavor, and a very obvious new liquor taste. The liquor body is mellow and sweet, with a clean and longtime aftertaste. |
| | The seventh round | Clear and transparent, with a very prominent Jiang flavor, a burnt, and a very obvious new liquor taste. The liquor body is mellow and sweet, with a clean and longtime aftertaste. |

TABLE 4

Comparison of Sensory Changes of Jiang-flavor New Liquor after Storage for 2 Years with Different Technologies

| Liquor sample | Round of Jiang-flavor new liquor | Sensory comments |
|---|---|---|
| Outdoor storage in jars for 2 years | The first round | Slightly yellow and transparent, with a very obvious Jiang flavor and a slight new liquor taste. The liquor body is mellow and sweet but not soft enough, with a clean and very longtime aftertaste. |
| | The second round | Slightly yellow and transparent, with a prominent Jiang flavor and a slight new liquor taste. The liquor body is mellow and sweet but not soft enough, with a clean and very longtime aftertaste. |
| | The third round | Slightly yellow and transparent, with a very obvious Jiang flavor, an obvious Daqu flavor and a slight new liquor taste. The liquor |

TABLE 4-continued

Comparison of Sensory Changes of Jiang-flavor New Liquor after Storage for 2 Years with Different Technologies

| Liquor sample | Round of Jiang-flavor new liquor | Sensory comments |
|---|---|---|
| | | body is mellow and sweet but not soft enough, with a clean and very longtime aftertaste. |
| | The fourth round | Slightly yellow and transparent, with a very obvious Jiang flavor, an obvious Daqu flavor and a slight new liquor taste. The liquor body is mellow and sweet but not soft enough, with a clean and very longtime aftertaste. |
| | The fifth round | Slightly yellow and transparent, with a very obvious Jiang flavor, an obvious Daqu flavor and a slight new liquor taste. The liquor body is mellow and sweet but not soft enough, with a clean and very longtime aftertaste. |
| | The sixth round | Slightly yellow and transparent, with a very prominent Jiang flavor, a Daqu flavor and a slight new liquor taste. The liquor body is mellow and sweet but not soft enough, with a clean and very longtime aftertaste. |
| | The seventh round | Slightly yellow and transparent, with a very obvious Jiang flavor, a Daqu flavor and a slight new liquor taste. The liquor body is mellow and sweet but not soft enough, with a clean and very longtime aftertaste. |
| Indoor storage in jars for 2 years | The first round | Slightly yellow and transparent, with a very obvious Jiang flavor and an obvious new liquor taste. The liquor body is mellow and sweet, with a clean and very longtime aftertaste. |
| | The second round | Slightly yellow and transparent, with a prominent Jiang flavor and an obvious new liquor taste. The liquor body is mellow and sweet, with a clean and very longtime aftertaste. |
| | The third round | Slightly yellow and transparent, with a very prominent Jiang flavor, a very obvious Daqu flavor, and an obvious new liquor taste. The liquor body is mellow and sweet, with a clean and very longtime aftertaste. |
| | The fourth round | Slightly yellow and transparent, with a very prominent Jiang flavor, a very obvious Daqu flavor, and an obvious new liquor taste. The liquor body is mellow and sweet, with a clean and very longtime aftertaste. |
| | The fifth round | Slightly yellow and transparent, with a very prominent Jiang flavor, a very obvious Daqu flavor, and an obvious new liquor taste. The liquor body is mellow and sweet, with a clean and very longtime aftertaste. |
| | The sixth round | Slightly yellow and transparent, with a very prominent Jiang flavor, a Daqu flavor, and an obvious new liquor taste. The liquor body is mellow and sweet, with a clean and very longtime aftertaste. |
| | The seventh round | Slightly yellow and transparent, with a very prominent Jiang flavor, a burnt, and an obvious new liquor taste. The liquor body is mellow and sweet, with a clean and very longtime aftertaste. |
| Storage in stainless steel tanks for 2 years | The first round | Slightly yellow and transparent, with a very obvious Jiang flavor and a very obvious new liquor taste. The liquor body is mellow and sweet, with a clean and very longtime aftertaste. |
| | The second round | Slightly yellow and transparent, with a prominent Jiang flavor and a very obvious new liquor taste. The liquor body is mellow and sweet, with a clean and very longtime aftertaste. |
| | The third round | Slightly yellow and transparent, with a very prominent Jiang flavor, a very obvious Daqu flavor, and a very obvious new liquor taste. The liquor body is mellow and sweet, with a clean and very longtime aftertaste. |

TABLE 4-continued

Comparison of Sensory Changes of Jiang-flavor New Liquor after Storage for 2 Years with Different Technologies

| Liquor sample | Round of Jiang-flavor new liquor | Sensory comments |
|---|---|---|
| | The fourth round | Slightly yellow and transparent, with a very prominent Jiang flavor, a very obvious Daqu flavor, and a very obvious new liquor taste. The liquor body is mellow and sweet, with a clean and very longtime aftertaste. |
| | The fifth round | Slightly yellow and transparent, with a very prominent Jiang flavor, a very obvious Daqu flavor, and a very obvious new liquor taste. The liquor body is mellow and sweet, with a clean and very longtime aftertaste. |
| | The sixth round | Slightly yellow and transparent, with a very prominent Jiang flavor, a Daqu flavor, and a very obvious new liquor taste. The liquor body is mellow and sweet, with a clean and very longtime aftertaste. |
| | The seventh round | Slightly yellow and transparent, with a very prominent Jiang flavor, a burnt, and a very obvious new liquor taste. The liquor body is mellow and sweet, with a clean and very longtime aftertaste. |

According to Table 1, Table 2, Table 3, and Table 4, there are significant differences in physicochemical indicators for all round of Jiang-flavor new liquors after being stored with different technologies in the first year. By comprehensively comparing the changes in sulfide content of new liquor having been stored for 1 and 2 years with three different technologies, the change for the outdoor storage in jars is found most significant. By comparing in combination with the sensory quality improvement effects, it can be concluded that there is no significant difference in sulfide content and sensory evaluation between 1 year of storage and 2 years of storage, and the sulfide volatilization mainly occurs in the first year, and the technology of outdoor storage in jars used in the first year is the most favorable storage technology among the three storage technologies for removing impurities and new liquor flavor in Jiang-flavor raw liquor.

(2) Storage in Stainless Steel Tanks for 1 to 2 Years

After the Jiang-flavor new liquor experiences the stage of “outdoor storage in jars”, the new liquor flavor of the liquors of all round is removed. At this time, the liquors of all rounds have different styles and characteristics, and the types and contents of flavoring substances are also different. According to the design requirements of each product grade, the raw liquors of all rounds of different flavor types (different production areas, grades, and typical bodies and other flavor types) are blended according to the design proportion to break the balance of the flavoring substances in the liquor and rearrange them, so that the style of liquor body is balanced and the flavor of the liquor body is harmonized, thus making the style and quality of the Jiang-flavor raw liquor harmonious and unified.

In this embodiment, the blending proportion is: 4% of the liquor of the first round, 11% of the liquor of the second round, 18% of the liquor of the third round, 22% of the liquor of the fourth round, 20% of the liquor of the fifth round, 16% of the liquor of the sixth round and 9% of the liquor of the seventh round.

After the above-mentioned Jiang-flavor raw liquors of all rounds having experienced “outdoor storage in jars” for 1 year are blended, three storage technologies are used to store them respectively for 1 year, 2 years and 3 years, with the changes in physicochmical indicators shown in Table 5, Table 6 and Table 7, and the sensory comparison results shown in Table 8, Table 9 and Table 10. Wherein the pottery jar is made from original limestone by firing it at 800° C., which is acid, alkali and corrosion resistant, with a good air permeability, and with an annual frost free period of 340 days during the storage; In term of stainless steel storage, the stainless steel tank is made of 304 stainless steel of food grade, with an annual frost free period of 330 days during one year of storage; The pottery jar for indoor storage is made from original limestone by firing it at 800° C., which is acid, alkali and corrosion resistant, with a good air permeability, and during the indoor storage, there is no direct sunlight, and the temperature is 22° C.

TABLE 5

Comparison of Changes in Physicochemical Indicators of Jiang-flavor Raw Liquor Having Experienced Outdoor Storage in Jars after Being Stored for 2 Years with Different Technologies

| Item | Initial value | Outdoor storage in jars for 1 year | Indoor storage in jars for 1 year | Storage in stainless steel tanks for 1 year |
|---|---|---|---|---|
| Total acid (g/l) | 2.05 | 2.08 | 2.07 | 2.07 |
| Total ester (g/l) | 3.71 | 3.67 | 3.71 | 3.71 |
| Acetaldehyde (mg/100 ml) | 46.29 | 47.62 | 46.38 | 46.59 |
| Acetal (mg/100 ml) | 54.68 | 60.63 | 57.97 | 52.48 |

TABLE 6

Comparison of Changes in Physicochemical Indicators of Jiang-flavor Raw Liquor Having Experienced Outdoor Storage in Jars after Being Stored for 3 Years with Different Technologies

| Item | Initial value | Outdoor storage in jars for 2 years | Indoor storage in jars for 2 years | Storage in stainless steel tanks for 2 years |
|---|---|---|---|---|
| Total acid (g/l) | 2.05 | 2.12 | 2.08 | 2.06 |
| Total ester (g/l) | 3.71 | 3.59 | 3.70 | 3.70 |
| Acetaldehyde (mg/100 ml) | 46.29 | 47.89 | 46.45 | 46.51 |
| Acetal (mg/100 ml) | 54.68 | 58.68 | 56.43 | 54.32 |

TABLE 7

Comparison of Changes in Physicochemical Indicators of Jiang-flavor Raw Liquor Having Experienced Outdoor Storage in Jars after Being Stored for 4 Years with Different Technologies

| Item | Initial value | Outdoor storage in jars for 3 year | Indoor storage in jars for 3 year | Storage in stainless steel tanks for 3 years |
|---|---|---|---|---|
| Total acid (g/l) | 2.05 | 2.16 | 2.08 | 2.07 |
| Total ester (g/l) | 3.71 | 3.52 | 3.69 | 3.70 |
| Acetaldehyde (mg/100 ml) | 46.29 | 45.45 | 47.32 | 44.16 |
| Acetal (mg/100 ml) | 54.68 | 59.57 | 56.83 | 55.68 |

TABLE 8

Comparison of Changes in Sensory Indicators of Jiang-flavor Raw Liquor Having Experiencing Outdoor Storage for 1 Year after Being Stored with Different Technologies for 1 Year

| Liquor sample | Sensory comments |
|---|---|
| Outdoor storage in jars for 1 year | Slightly yellow and transparent, with a prominent Jiang flavor and a new liquor taste. The liquor body is mellow and sweet but not soft enough, with a clean and very longtime aftertaste. |
| Indoor storage in jars for 1 year | Slightly yellow and transparent, with a prominent Jiang flavor and a new liquor taste. The liquor body is mellow and sweet, with a clean and very longtime aftertaste. |
| Storage in stainless steel tanks for 1 year | Slightly yellow and transparent, with a prominent Jiang flavor and a slight new liquor taste. The liquor body is mellow and sweet, with a clean and very longtime aftertaste. |

TABLE 9

Comparison of Changes of Jiang-flavor Raw Liquor in Sensory Indicators after Outdoor Storage in Jars for 2 Years with Different Technologies

| Liquor sample | Sensory comments |
|---|---|
| Outdoor storage in jars for 2 years | The liquor body is slightly yellow and transparent, with a prominent Jiang flavor. The liquor body is mellow and sweet but not soft enough, with a clean and very longtime aftertaste. |
| Indoor storage in jars for 2 years | The liquor body is slightly yellow and transparent, with a prominent and comfortable Jiang flavor. The liquor body is mellow, with a clean and very longtime aftertaste. |
| Storage in stainless steel tanks for 2 years | The liquor body is slightly yellow and transparent, with a prominent, comfortable and harmonious Jiang flavor. The liquor body is mellow, with a clean and very longtime aftertaste. |

TABLE 10

Comparison of Changes of Jiang-flavor Raw Liquor in Sensory Indicators after Outdoor Storage in Jars for 4 Years with Different Technologies

| Liquor sample | Sensory comments |
|---|---|
| Outdoor storage in jars for 3 year | The liquor body is slightly yellow and transparent, with a prominent Jiang flavor. The liquor body is mellow and sweet but not soft enough, with a clean and very longtime aftertaste. |
| Indoor storage in jars for 3 year | The liquor body is slightly yellow and transparent, with a prominent and comfortable Jiang flavor, and slight. The liquor body is mellow, with a clean and very longtime aftertaste. |
| Storage in stainless steel tanks for 3 years | The liquor body is slightly yellow and transparent, with a prominent and comfortable Jiang flavor. The liquor body is mellow and sweet, with a clean and very longtime aftertaste. |

It can be seen from Table 5, Table 6, Table 7, Table 8, Table 9, and Table 10 that, by comparing the physicochemical indicators and sensory quality of Jiang-flavor raw liquor stored for 2, 3, and 4 years with three different technologies, it is found that the Jiang-flavor raw liquor after "outdoor storage in jars" was blended and put into stainless steel liquor tanks for blending and aging for 1-2 years, and the sensory changes of the liquor body are particularly significant, with relatively slow changes in physicochemical indicators. Therefore, the verification of the storage and aging effect was mainly based on sensory evaluation. Conclusion: After outdoor storage in jars for 1 year, the Jiang-flavor raw liquors of all rounds are blended and stored with three different technologies. It can be found that in sensory evaluation results, the storage in stainless steel tanks are slightly better than indoor storage in jars, and better than outdoor tank storage, besides, the storage in stainless steel tanks for 2 years and the storage in stainless steel tanks for 1 year are better than the storage in stainless steel tanks for 3 years, and the storage in stainless steel tanks for 2 years is slightly better than the storage in stainless steel tanks for 1 year.

(3) Indoor Storage in Jars for 3 to 10 Years

The Jiang-flavor raw liquors having experienced "outdoor storage in jars" for 1 year and "storage in stainless steel tanks" for 2 years are stored for 2 years, 3 years, 7 years, 10 years and 12 years respectively, with the physicochmical indicators shown in Table 11, Table 12, Table 13, Table 14 and Table 15, and the sensory evaluation indicators shown in Table 16, Table 17, Table 18, Table 19 and Table 20.

Wherein the pottery jar is made from original limestone by firing it at 1100° C., which is acid, alkali and corrosion resistant, with a good air permeability, and with an annual frost free period of 350 days during the storage; In term of stainless steel storage, the stainless steel tank is made of 304 stainless steel of food grade, with an annual frost free period of 350 days during one year of storage; The pottery jar for indoor storage is made from original limestone by firing it at 1100° C., which is acid, alkali and corrosion resistant, with a good air permeability, and during the indoor storage, there is no direct sunlight, and the temperature is 18° C.

TABLE 11

Changes in Physicochemical Indicators of Jiang-flavor Raw Liquor Having Experienced Outdoor Storage in Jars for 1 Year and Storage in Stainless Steel Tanks for 3 years after Being Stored for 2 Years with Different Technologies

| Item | Initial value | Outdoor storage in jars for 2 year | Indoor storage in jars for 2 year | Storage in stainless steel tanks for 2 years |
|---|---|---|---|---|
| Total acid (g/l) | 2.06 | 2.23 | 2.09 | 2.08 |
| Total ester (g/l) | 3.70 | 3.47 | 3.69 | 3.69 |
| Acetaldehyde (mg/100 ml) | 46.51 | 44.86 | 46.03 | 45.76 |
| Acetal (mg/100 ml) | 54.32 | 56.87 | 55.84 | 54.26 |

TABLE 12

Changes in Physicochemical Indicators of Jiang-flavor Raw Liquor Having Experienced Outdoor Storage in Jars for 1 Year and Storage in Stainless Steel Tanks for 3 Years after Being Stored for 3 Years with Different Technologies

| Item | Initial value | Outdoor storage in jars for 3 year | Indoor storage in jars for 3 year | Storage in stainless steel tanks for 3 years |
|---|---|---|---|---|
| Total acid (g/l) | 2.06 | 2.31 | 2.08 | 2.09 |
| Total ester (g/l) | 3.70 | 3.34 | 3.67 | 3.69 |
| Acetaldehyde (mg/100 ml) | 46.51 | 44.65 | 45.36 | 45.73 |
| Acetal (mg/100 ml) | 54.32 | 56.47 | 57.31 | 56.73 |

TABLE 13

Changes in Physicochemical Indicators of Jiang-flavor Raw Liquor Having Experienced Outdoor Storage in Jars for 1 Year and Storage in Stainless Steel Tanks for 3 Years after Being Stored for 7 Years with Different Technologies

| Item | Initial value | Outdoor storage in jars for 7 year | Indoor storage in jars for 7 year | Storage in stainless steel tanks for 7 years |
|---|---|---|---|---|
| Total acid (g/l) | 2.06 | 2.45 | 2.21 | 2.22 |
| Total ester (g/l) | 3.70 | 3.12 | 3.43 | 3.47 |
| Acetaldehyde (mg/100 ml) | 46.51 | 40.21 | 43.76 | 44.67 |
| Acetal (mg/100 ml) | 54.32 | 77.77 | 78.35 | 77.83 |

TABLE 14

Changes in Physicochemical Indicators of Jiang-flavor Raw Liquor Having Experienced Outdoor Storage in Jars for 1 Year and Storage in Stainless Steel Tanks for 3 years after Being Stored for 10 Years with Different Technologies

| Item | Initial value | Outdoor storage in jars for 10 year | Indoor storage in jars for 10 year | Storage in stainless steel tanks for 10 years |
|---|---|---|---|---|
| Total acid (g/l) | 2.08 | 2.55 | 2.28 | 2.37 |
| Total ester (g/l) | 3.41 | 3.09 | 3.35 | 3.28 |
| Acetaldehyde (mg/100 ml) | 50.65 | 46.63 | 48.59 | 47.41 |
| Acetal (mg/100 ml) | 64.62 | 67.81 | 78.53 | 70.66 |

TABLE 15

Changes in Physicochemical Indicators of Jiang-flavor Raw Liquor Having Experienced Outdoor Storage in Jars for 1 Year and Storage in Stainless Steel Tanks for 3 Years after Being Stored for 12 Years with Different Technologies

| Item | Initial value | Outdoor storage in jars for 12 year | Indoor storage in jars for 12 year | Storage in stainless steel tanks for 12 years |
|---|---|---|---|---|
| Total acid (g/l) | 2.08 | 2.69 | 2.32 | 2.45 |
| Total ester (g/l) | 3.41 | 2.98 | 3.24 | 3.17 |
| Acetaldehyde (mg/100 ml) | 50.65 | 44.27 | 45.65 | 48.54 |
| Acetal (mg/100 ml) | 64.62 | 71.57 | 79.53 | 82.04 |

TABLE 16

Changes in Sensory Indicators of Jiang-flavor Raw Liquor Having Experienced Outdoor Storage in Jars for 1 Year and Storage in Stainless Steel Tanks for 3 years after Being Stored for 2 Years with Different Technologies

| Liquor sample | Sensory comments |
|---|---|
| Outdoor storage in jars for 2 years | Slightly yellow and transparent, with a very prominent Jiang flavor and very obvious Chen flavor. The liquor body is mellow and sweet but not soft enough, with a clean and very longtime aftertaste. |
| Indoor storage in jars for 2 years | Slightly yellow and transparent, with a very prominent Jiang flavor and very obvious Chen flavor. The liquor body is mellow and sweet, with a clean and very longtime aftertaste. |

TABLE 16-continued

Changes in Sensory Indicators of Jiang-flavor Raw Liquor Having Experienced Outdoor Storage in Jars for 1 Year and Storage in Stainless Steel Tanks for 3 years after Being Stored for 2 Years with Different Technologies

| Liquor sample | Sensory comments |
|---|---|
| Storage in stainless steel tanks for 2 years | Slightly yellow and transparent, with a very prominent Jiang flavor and very obvious Chen flavor. The liquor body is mellow and sweet, with a clean and longtime aftertaste. |

TABLE 17

Changes in Sensory Indicators of Jiang-flavor Raw Liquor Having Experienced Outdoor Storage in Jars for 1 Year and Storage in Stainless Steel Tanks for 3 years after Being Stored for 3 Years with Different Technologies

| Liquor sample | Sensory comments |
|---|---|
| Outdoor storage in jars for 3 years | Slightly yellow and transparent, with a very prominent Jiang flavor and very obvious Chen flavor. The liquor body is mellow and sweet but not soft enough, with a clean and very longtime aftertaste. |
| Indoor storage in jars for 3 years | Slightly yellow and transparent, with a very prominent Jiang flavor and very obvious Chen flavor. The liquor body is mellow and sweet, with a clean and very longtime aftertaste. |
| Storage in stainless steel tanks for 3 years | Slightly yellow and transparent, with a very prominent Jiang flavor and very obvious Chen flavor. The liquor body is mellow and sweet, with a clean and longtime aftertaste. |

TABLE 18

Changes in Sensory Indicators of Jiang-flavor Raw Liquor Having Experienced Outdoor Storage in Jars for 1 Year and Storage in Stainless Steel Tanks for 3 years after Being Stored for 7 Years with Different Technologies

| Liquor sample | Sensory comments |
|---|---|
| Outdoor storage in jars for 7 years | Slightly yellow and transparent, with a very prominent Jiang flavor. The liquor body is mellow but not soft enough, with a clean and very longtime aftertaste. |
| Indoor storage in jars for 7 years | Slightly yellow and transparent, with a very prominent Jiang flavor. The liquor body is mellow, elegant and delicate, with a clean and very longtime aftertaste. |
| Storage in stainless steel tanks for 7 years | Slightly yellow and transparent, with a very prominent Jiang flavor. The liquor body is mellow, elegant and delicate, with a clean and very longtime aftertaste. |

TABLE 19

Changes in Sensory Indicators of Jiang-flavor Raw Liquor Having Experienced Outdoor Storage in Jars for 1 Year and Storage in Stainless Steel Tanks for 3 years after Being Stored for 10 Years with Different Technologies

| Liquor sample | Sensory comments |
|---|---|
| Outdoor storage in jars for 10 years | Slightly yellow and transparent, with a very prominent Jiang flavor and a sour flavor. The liquor body is mellow but not soft enough, with a clean and very longtime aftertaste. |

TABLE 19-continued

Changes in Sensory Indicators of Jiang-flavor Raw Liquor Having Experienced Outdoor Storage in Jars for 1 Year and Storage in Stainless Steel Tanks for 3 years after Being Stored for 10 Years with Different Technologies

| Liquor sample | Sensory comments |
|---|---|
| Indoor storage in jars for 10 years | Slightly yellow and transparent, with a very prominent Jiang flavor and Chen flavor, and prominent Laotan flavor. The liquor body is mellow, elegant and delicate, and the flavors are harmonious, with a clean and very longtime aftertaste. |
| Storage in stainless steel tanks for 10 years | Slightly yellow and transparent, with a very prominent Jiang flavor and Chen flavor. The liquor body is mellow, soft and delicate, with a clean and very longtime aftertaste. |

TABLE 20

Changes in Sensory Indicators of Jiang-flavor Raw Liquor Having Experienced Outdoor Storage in Jars for 1 Year and Storage in Stainless Steel Tanks for 3 years after Being Stored for 12 Years with Different Technologies

| Liquor sample | Sensory comments |
|---|---|
| Outdoor storage in jars for 12 years | Slightly yellow and transparent, with a very prominent Jiang flavor and a sour flavor. The liquor body is mellow but not soft enough, with a clean and very longtime aftertaste. |
| Indoor storage in jars for 12 years | Slightly yellow and transparent, with very prominent Jiang flavor, Chen Flavor and Laotan flavor. The liquor body is mellow, elegant and delicate, and the flavors are harmonious, with a clean and very longtime aftertaste. |
| Storage in stainless steel tanks for 12 years | Slightly yellow and transparent, with a very prominent Jiang flavor. The liquor body is mellow, elegant and delicate, with a clean and very longtime aftertaste. |

From 11-20, it can be seen that the physicochemical indicators of the liquor body are relatively slow, while the sensory changes are very obvious, by comparing the sensory quality of Jiang-flavor raw liquor stored with three different technologies. Therefore, the verification of the storage and aging effect is mainly based on sensory evaluation. It is concluded that the Jiang-flavor raw liquor having experienced indoor storage in jars for 2 to 10 years is good in sensory quality, while Jiang-flavor raw liquor having experienced indoor storage in jars for 10 years is the best in sensory quality. In this stage, the indoor storage in jars is better than the storage in stainless steel tanks and the outdoor storage in jars.

To sum it up, depending on the storage and aging effects of different containers, times, environments and methods, and in combination with the storage requirements of Jiang-flavor raw liquor in different periods of time, a method for aging and storage of Jiang-flavor raw liquor by "growing, nourishing and storing" is invented, in a storage path of "outdoor storage in jars"→"storage in stainless steel tanks"→"indoor storage in jars", which is specifically as follows: the Jiang-flavor new liquors of all rounds are subjected to outdoor storage in jars for not more than 1 year, then the Jiang-flavor raw liquors are blended and put into stainless steel tank for blending and aging for a period of 1 to 2 years, and finally the Jiang-flavor raw liquor undergoes indoor storage in jars for 2 to 10 years.

With the storage method of the present invention, the combination of different storage containers with different storage years are realized, thus improving the aging and storage effect and the quality of the Jiang-flavor raw liquor in a targeted manner.

All above are only preferred embodiments of the present invention, which do not limit the scope of the present invention. All alterations, equivalent replacements and improvements, without departing from the spirit and principle of the present invention, shall fall into the protection scope of the present invention.

The invention claimed is:

1. A method for aging and storage of jiang-flavor liquor by growing, nourishing and storing, comprising storing a fresh jiang-flavor liquor outdoor in a jar; then storing outdoor in a stainless steel tank; and finally storing indoor in a jar.

2. The method for aging and storage of jiang-flavor liquor by growing, nourishing and storing according to claim 1, comprising:

s1, aging a plurality of batches of fresh jiang-flavor liquor individually in pottery jars placed outdoor for a period of not more than one year to obtain a plurality of aged liquors;

s2, blending the plurality of aged liquors from S1 to obtain a blended liquor; aging the blended liquor in a stainless liquor tank outdoor for a period of 1 to 2 years; and s3, aging the blended liquor from S2 in a pottery jar placed indoor for a period of 2 to 10 years.

3. The method for aging and storage of jiang-flavor liquor by growing, nourishing and storing according to claim 2, where in the plurality of batches of fresh Jiang-flavor liquor includes at least one of the first, the second, the third, the fourth, the fifth, the sixth and the seventh batches of fresh jiang-flavor liquor.

4. The method for aging and storage of jiang-flavor liquor by growing, nourishing and storing according to claim 2, wherein the pottery jars placed outdoor and the pottery jar placed indoor are made from limestone fired at 800-1100° C.

5. The method for aging and storage of jiang-flavor liquor by growing, nourishing and storing according to claim 2, wherein, in S1, an annual frost free period outdoor is more than 300 days.

6. The method for aging and storage of jiang-flavor liquor by growing, nourishing and storing according to claim 2, wherein the stainless steel liquor tank is made of food grade 304 stainless steel.

7. The method for aging and storage of jiang-flavor liquor by growing, nourishing and storing according to claim 2, wherein, in S2, an annual frost free period is more than 300 days.

8. The method for aging and storage of jiang-flavor liquor by growing, nourishing and storing according to claim 7, wherein, in S3, a temperature indoor is in a range of 18-22° C.

9. A jiang-flavor liquor made according to the method of claim 1.

* * * * *